United States Patent
Della Femina et al.

(10) Patent No.: US 9,429,035 B2
(45) Date of Patent: Aug. 30, 2016

(54) METHOD FOR FORMING AN IMPROVED THERMAL BARRIER COATING (TBC), THERMAL-BARRIER-COATED ARTICLE AND METHOD FOR THE REPAIR THEREOF

(75) Inventors: Maurizio Della Femina, Melito (IT); Marco Rossi, Rionero Sannitico (IT); Raffaele Casillo, Capua (IT); Carlo Silvestro, Pomigliano d'Arco (IT)

(73) Assignee: GE AVIO S.R.L, Turin (IT)

(*) Notice: Subject to any disclaimer, the term of this patent is extended or adjusted under 35 U.S.C. 154(b) by 302 days.

(21) Appl. No.: 14/237,255

(22) PCT Filed: Aug. 3, 2012

(86) PCT No.: PCT/EP2012/065305
§ 371 (c)(1),
(2), (4) Date: Sep. 18, 2014

(87) PCT Pub. No.: WO2013/020935
PCT Pub. Date: Feb. 14, 2013

(65) Prior Publication Data
US 2015/0030877 A1   Jan. 29, 2015

(30) Foreign Application Priority Data
Aug. 5, 2011 (IT) .............................. TO2011A0734

(51) Int. Cl.
*C23C 10/18* (2006.01)
*F01D 25/00* (2006.01)
(Continued)

(52) U.S. Cl.
CPC .............. *F01D 25/007* (2013.01); *C23C 4/06* (2013.01);
(Continued)

(58) Field of Classification Search
CPC .............................. C23C 10/48; F01D 25/007
See application file for complete search history.

(56) References Cited

U.S. PATENT DOCUMENTS

| 4,101,713 A | 7/1978 | Hirsch et al. |
| 5,922,409 A | 7/1999 | McMordie et al. |

(Continued)

FOREIGN PATENT DOCUMENTS

| EP | 1079002 | 2/2001 |
| EP | 1927672 | 6/2008 |

OTHER PUBLICATIONS

International Search Report dated Nov. 16, 2012 corresponding to PCT Application No. PCT/EP2012/065305; 5 pages.
(Continued)

*Primary Examiner* — Nathan Empie
(74) *Attorney, Agent, or Firm* — Ohlandt, Greeley, Ruggiero & Perle, LLP (57) ABSTRACT

The invention refers to a process for the formation of a thermal barrier coating on a substrate, comprising the steps of:
a) applying a bond coat on the substrate;
b) subjecting the bond coat to a low activity aluminizing process, thus obtaining, above the bond coat, a temporary intermediate diffusion layer;
c) applying, on the temporary intermediate diffusion layer, aluminum powder in suspension with a solvent or aqueous base, said aluminum powder having size distribution from 15 to 150 μm;
d) performing a thermal treatment in a vacuum at a pressure from $10^{-3}$ to $10^{-5}$ bars, at a temperature from 800° C. to 1050° C. and with an active phase having duration in the range of 60 minutes to 4 hours, thus obtaining above the bond coat an enriched intermediate diffusion layer; and
e) applying a definitive barrier layer on said enriched intermediate diffusion layer.

9 Claims, 4 Drawing Sheets (51) Int. Cl.
*C23C 10/48* (2006.01)
*C23C 10/50* (2006.01)
*C23C 24/08* (2006.01)
*C23C 4/06* (2016.01)
*C23C 4/10* (2016.01)
*C23C 4/18* (2006.01)

(52) U.S. Cl.
CPC ............... *C23C 4/073* (2016.01); *C23C 4/10* (2013.01); *C23C 4/18* (2013.01); *C23C 10/18* (2013.01); *C23C 10/48* (2013.01); *C23C 10/50* (2013.01); *C23C 24/087* (2013.01); *Y10T 428/12618* (2015.01)

(56) References Cited

U.S. PATENT DOCUMENTS

| | | |
|---|---|---|
| 6,129,991 A | 10/2000 | Warnes et al. |
| 7,157,151 B2 | 1/2007 | Creech et al. |
| 2002/0094445 A1* | 7/2002 | Sangeeta .............. C23C 10/02 428/553 |

OTHER PUBLICATIONS

Written Opinion dated Nov. 16, 2012 corresponding to PCT Application No. PCT/EP2012/065305; 7 pages.

* cited by examiner

METHOD FOR FORMING AN IMPROVED THERMAL BARRIER COATING (TBC), THERMAL-BARRIER-COATED ARTICLE AND METHOD FOR THE REPAIR THEREOF

TECHNICAL FIELD

The present invention relates to a method for the formation of a thermal barrier coating (TBC), in particular for the protection of metal substrates which are exposed, in use, to high temperatures and highly oxidising ambient conditions, as in the case of components of turbines which are commonly used for the production of energy or for propulsion in the aeronautical sector.

The invention furthermore relates to articles coated with the thermal barrier coating.

Lastly, the invention relates to a process for the repair of articles coated with a thermal barrier coating.

BACKGROUND ART

It is known that the components of the high temperature sections of turbines and relative accessories are protected with a thermal barrier coating, both when they are parts of aeronautical engines and when they are inside gas turbines intended for the production of energy.

In general, a thermal barrier coating has a multilayer structure. Typically, a thermal barrier coating comprises a definitive barrier layer, also called top coat, arranged on a connecting layer, also called bond coat, which, in turn, is arranged immediately above the substrate to be protected.

Figure 1:
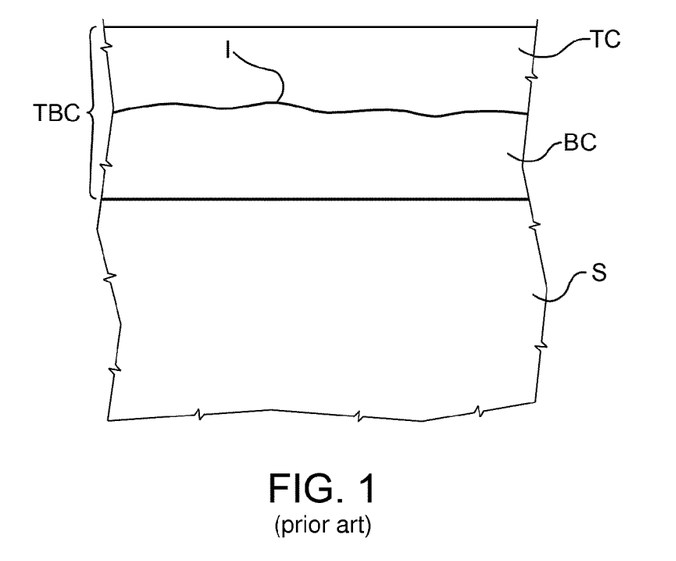
FIGS. 1 to 3 illustrate respective schematic views in section of relative embodiments of a thermal barrier coating according to the known art.

FIG. 1 schematically illustrates a detail of an article provided with a thermal barrier coating TBC of known type. A substrate S is defined by a portion of a component to be protected, for example a component of a turbine. A bond coat BC is arranged immediately on the substrate S. The bond coat BC generally comprises metallic materials such as cobalt, nickel, chromium, aluminium, yttrium, etc.

The bond coat BC is applied to the substrate S by means of an appropriate known deposition technique such as, for example, thermal spray, vacuum plasma spray (VPS), air plasma spray (APS), etc.

The structure and roughness of the outermost surface of the bond coat BC depend, in general, on the deposition technique and the powder used.

Referring again to FIG. 1, a top coat TC is lastly arranged on the bond coat BC and defines below, with the latter, an interface I.

The top coat TC typically comprises a ceramic material, for example yttrium-stabilised zirconia, and is, in turn, applied on the bond coat BC by means of an appropriate known deposition technique, typically by APS or by Electron Beam Physical Vapour Deposition (EB-PVD).

It is known, for example from U.S. Pat. No. 5,403,669, that aluminium is diffused inside the bond coat BC before proceeding with deposition of the top coat TC, in order to increase resistance to the highly oxidising environments of the thermal barrier coating as a whole.

Figure 2:
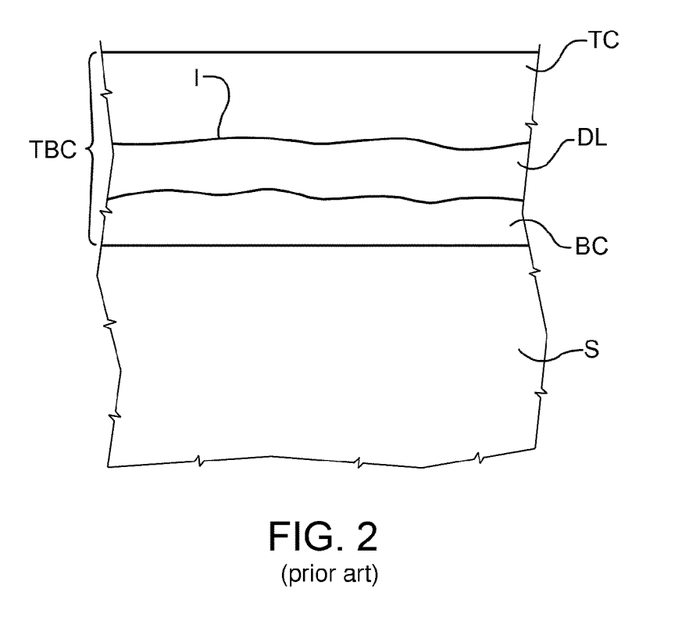

FIG. 2 schematically illustrates the structure of a thermal barrier coating TBC described by U.S. Pat. No. 5,403,669. This structure differs from the conventional structure of FIG. 1 due to the presence, between the top coat TC and the bond coat BC, of an intermediate diffusion layer DL which is formed by means of the above-mentioned aluminium diffusion process. Said intermediate diffusion layer DL has the property of being able to develop, when exposed to high temperatures (for example above 900° C.), a protective surface film, which substantially consists of $Al_2O_3$.

In particular, according to U.S. Pat. No. 5,403,669, it is expedient for the intermediate diffusion layer DL to have at the top a surface roughness Ra (arithmetic mean roughness) between 200 and 600 microinches (that is between 5.08 and 15.24 μm).

Roughness values below 200 microinches (5.08 μm) are not sufficient to guarantee anchoring of the top coat TC. On the contrary, values above 600 microinches (15.24 μm) result in a surface porosity which is too high to be appropriately sealed by the diffused aluminium and consequently opens up preferential routes for premature oxidisation.

Various techniques are available to achieve the diffusion of aluminium inside the bond coat. Of these, an "in pack" method, a method based on chemical vapour deposition (CVD), localised application methods, etc. have been successfully used.

Among the CVD methods, moreover, two different operating modes called "low activity aluminizing" (or also diffusion towards the outside) and "high activity aluminizing" (or also diffusion towards the inside) are possible and widespread.

A "high activity" coating is formed when the activity of the aluminium is greater than the activity of the components of the alloy of which the substrate is composed. The aluminium diffuses towards the inside more rapidly than the speed at which the components of the alloy constituting the substrate diffuse towards the outside. A "low activity" coating is formed, on the other hand, when the activity of the aluminium is less than the activity of the components of the alloy of which the substrate is composed. Typically, the low activity process requires higher operating temperatures. The final structure and composition of the intermediate diffusion layer vary, in general, depending on the type of alloy constituting the substrate.

A typical example of a low density aluminizing process is described e.g. in EP1927672, which teaches applying by cold spray, over a bond coat of CoNiCrAlY alloy, an aluminium film, and subsequently employing a thermal treatment in vacuum in order to favour the diffusion of aluminium into the bond coat.

A thermal barrier coating TBC of the type illustrated in FIG. 2 was applied to turbine components. In the stator portions (generally airfoil) where the only protective coating applied was the one obtained by the aluminizing process, better performance was recorded in terms of resistance to oxidisation and corrosion. Nevertheless, a significant reduction in the surface roughness of the coatings deposited by the "low activity" process when compared with those deposited by the "high activity" process was systematically observed.

The generalised reduction in roughness resulting from a "low activity" aluminizing process of the type described above entails some disadvantages in the areas of the stator where the coating to be applied is of the bond coat/intermediate diffusion layer (Al)/top coat type.

In particular, a sudden deterioration was recorded in the quality of adhesion of the top coat to the layers below of the thermal barrier coating. Furthermore, a significant deterioration was observed in the resistance of the coating to thermal fatigue cycles. Said reductions were identified experimentally by means of comparative thermal cycling tests, and confirmed by comparative tensile strength tests and micrographic analyses. Moreover, the existence of a relationship between resistance of the thermal barrier coating and the degree of adhesion between top coat and layers below has been repeatedly pointed out also in the patent literature (for example in U.S. Pat. No. 4,335,190 and US2007/0178247).

In other words, it has been observed that the application of an aluminium coating by means of a low activity aluminizing process as the one described in the prior art cited is, on the one hand, able to improve the resistance to oxidisation of the portions where the protective aluminium layer is the only one present; at the same time, however, it drastically reduces resistance to thermal fatigue of the thermal barrier coating, where a bond coat is present on top of the aluminium layer. With that method, in fact, a high risk of premature detachment of the top coat has been recorded, with consequent probable functioning problems and significant reduction in the working life of the component.

On average, therefore, a worsening has been observed in the resistance of the turbine component to thermal fatigue.

In order to bring resistance and adhesion of the thermal barrier coating back to values comparable to those consolidated prior to introduction of the low activity aluminizing, a method has been proposed which entails a laborious process of restoring an adequate interface between bond coat and top coat.

In practice, said restoring operation is performed via the deposition of an additional layer of bond coat and subsequent local aluminizing of this additional layer. Following this operation, a roughness Ra greater than 500 microinches (12.7 μm) is recorded (on average).

In this way, optimal roughness is restored at the interface on which the top coat will be deposited. However, the sequence of the layers in the thermal barrier coating is no longer "bond coat/intermediate diffusion layer (Al)/top coat", but "first bond coat BC/first intermediate diffusion layer (Al) DL/second bond coat BC'/second intermediate diffusion layer (Al) DL'/top coat TC". Said configuration is shown schematically in FIG. 3 in which, for the sake of simplicity of interpretation, the same reference symbols as those used in FIGS. 1 and 2 have been combined with the corresponding elements.

Figure 3:
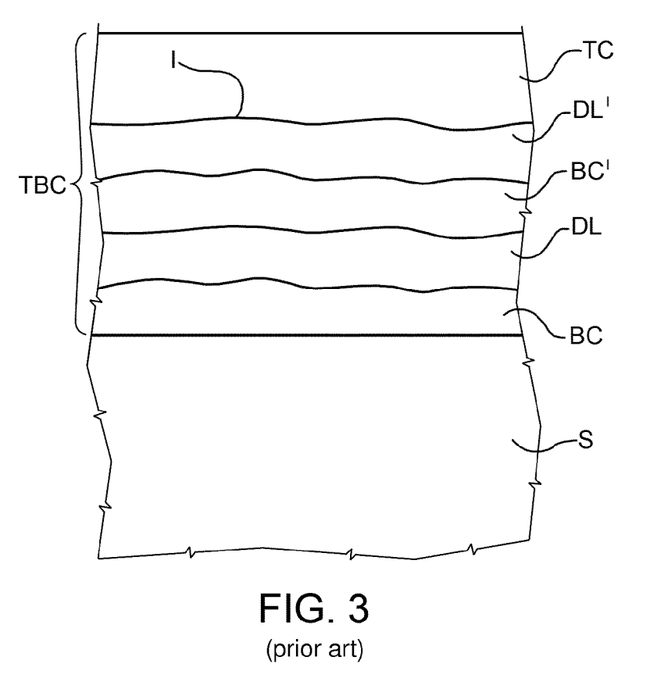

Firstly, it should be observed that said sequence of layers is not the one generally referred to when producing the construction drawings of the components. Secondly, with this modified sequence of layers, horizontal delaminations frequently occur with length varying from 0.1 to 2 mm. Furthermore, in practice it is not possible to guarantee that the second intermediate diffusion layer DL' completely covers the first bond coat BC. Consequently, discontinuities very frequently form which can, in use, undermine the fatigue resistance of the thermal barrier coating as a whole.

In short, while restoring the correct adhesion between bond coat and top coat, the solution proposed for tackling the adhesion problem, provides an overall structure which is far from meeting the generally recognised requirements and standards and which has some inherent internal defects. Furthermore, the application of this solution is particularly demanding in terms of production times and costs.

The need is therefore felt in the sector to provide an alternative method for the formation on a substrate of a thermal barrier coating which allows the drawbacks previously described to be overcome.

In greater detail, the need is felt to provide a method for the formation of a thermal barrier coating such as to meet the requirements of the particular conditions of use of the substrate, in particular when the latter is intended to be exposed, in use, to high temperatures and strongly oxidising conditions. Above all, the requirement is for a process that allows a particularly stable adhesion to be obtained between the top coat and bond coat, or more generally with the layers below of the thermal barrier coating. Finally, the need is felt in the art for a method for the formation of a thermal barrier coating such as to ensure improved performances in terms of resistance to thermal fatigue cycles, thereby preserving for as long as possible the mechanical properties of a component protected with said thermal bond coating.

DISCLOSURE OF INVENTION

The object of the present invention is therefore to provide a method for the formation of a thermal barrier coating alternative to the known solutions and which allows at least one of the above-mentioned needs to be met simply and economically, with particular reference to the improvement of adhesion between the TC and BC layers and of the mechanical properties of a component protected with said thermal barrier coating.

The above-mentioned object is achieved by the present invention, since it is relative to a method as defined in claim 1.

According to another aspect of the present invention, a method is provided for the repair of an article coated with a thermal barrier as claimed in claim 9.

BRIEF DESCRIPTION OF THE DRAWINGS

For a better understanding of the present invention, a preferred embodiment thereof is described below, purely by way of non-limiting example and with reference to the accompanying drawings, in which.

BEST MODE FOR CARRYING OUT THE INVENTION

Figure 4:
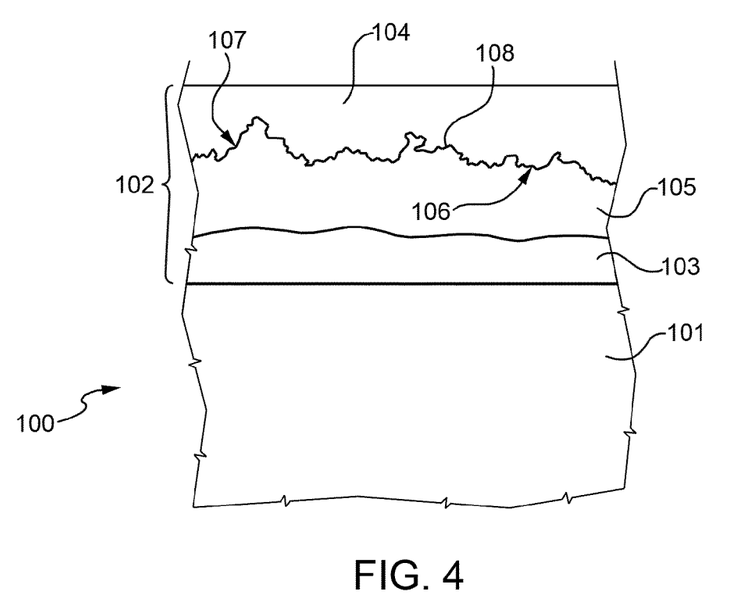
FIG. 4 illustrates a schematic view in section of a thermal barrier coating obtained according to the method of the present invention.

In FIG. 4 the number 100 indicates an article coated with thermal barrier. In particular, the coated article 100 comprises a substrate 101 and a thermal barrier coating 102.

The substrate 101 is, typically, defined by a portion of a component intended to be exposed, in use, to high temperatures and/or to strongly oxidising conditions. In particular, the substrate 101 can be defined by a portion of a component of a turbine, regardless of whether the latter is used for propulsion in the aeronautical sector or for the production of energy. For example, the substrate 101 is a fixed or moving blade, a nozzle, a combustion chamber, a post-burner, etc.

Typically, the substrate 101 has a metallic matrix, for example it comprises a superalloy based on nickel or iron or cobalt. Preferably, the substrate is substantially made of such superalloy.

The thermal barrier coating 102 comprises a connecting layer or bond coat 103 arranged on the substrate 101 and a definitive barrier layer or top coat 104 arranged on the bond coat.

The bond coat 103 typically comprises one or more metallic materials, for example selected from the group consisting of Co, Ni, Cr, Al, Y and relative alloys. For example, the bond coat can comprise a MeCrAlY alloy, where Me is a metal selected from the group consisting of Co, Ni and Fe.

Preferably, the bond coat 103 has a surface roughness Ra in the range of 200 to 600 microinches (or 5.08 to 15.24 μm).

The top coat 104 typically comprises a ceramic material, for example zirconium, zirconium stabilised with yttrium, etc.

Advantageously, the thermal barrier coating 102 furthermore comprises an intermediate diffusion layer 105 between bond coat 103 and top coat 104.

The intermediate diffusion layer 105 advantageously comprises an undulated corrugated surface 106 with high degree of roughness, arranged against a corresponding inner surface 107 of the top coat 104 so as to define a relative interface zone 108.

Figure 5:
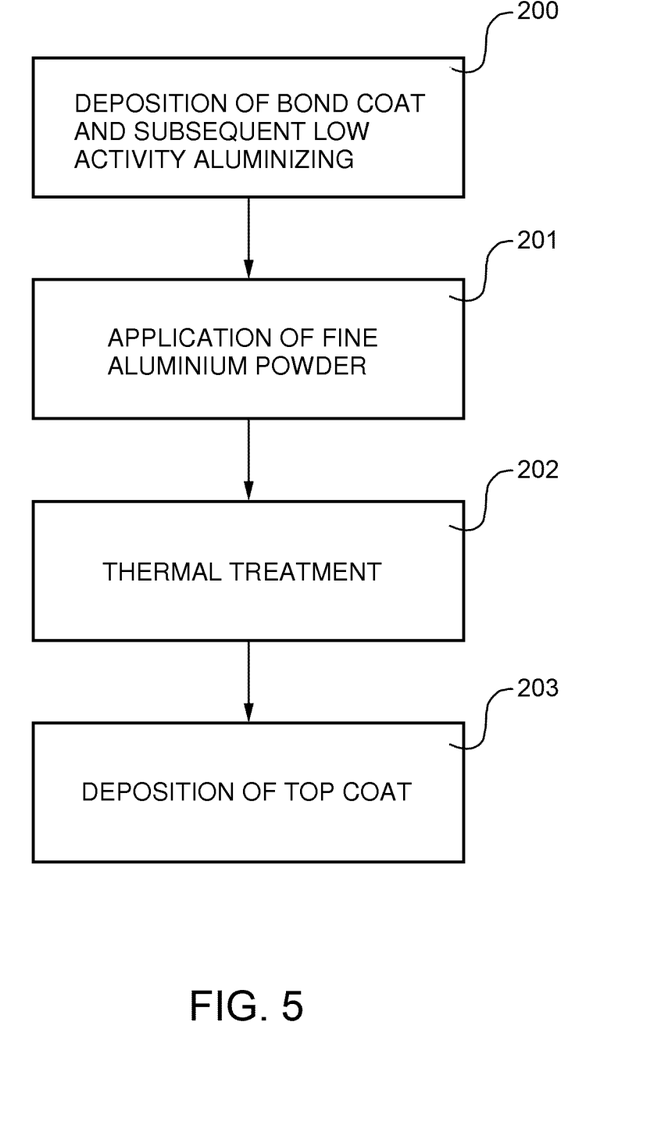
FIG. 5 is a flow chart summarily illustrating the steps of the method of the present invention.

Said intermediate diffusion layer 105 is advantageously obtained according to the method of the invention, which will be described below with reference to the flow chart of FIG. 5.

In block 200, a bond coat 103 is applied to the substrate 101 by means of an appropriate deposition technique, for example thermal spray, vacuum plasma spray (VPS), air plasma spray (APS), etc. Furthermore, the bond coat 103 is subjected to a low activity aluminizing process (known in the art and, therefore, not described here in detail). In this way a temporary intermediate diffusion layer—analogous to the layer DL of FIGS. 2 and 3—is obtained on the bond coat.

In block 201, fine aluminium powder is advantageously applied on said temporary intermediate diffusion layer.

Preferably, the aluminium powder has a size distribution of 15 to 150 μm. An aluminium powder finer than 15 μm would not allow surface roughness values to be obtained at the interface 108 such as to guarantee satisfactory adhesion between top coat 104 and the layer below 105. On the other hand, an aluminium powder with a size distribution coarser than 150 μm can produce, at the interface 108, excessive porosity and surface discontinuity, both of which are undesirable.

More preferably, the aluminium powder has a size distribution of 30 to 100 μm.

With an aluminium powder having said size distribution the most satisfactory results were obtained in terms of adhesion of the top coat 104 and, in general, resistance to thermal fatigue of the entire thermal barrier coating 102.

Preferably, the aluminium powder is applied in suspension with a solvent or aqueous base. For example, a liquid suspension can be used, preferably containing a suitable binder so that the aluminium powder remains suspended in a stable manner, ensuring that it is stirred periodically to prevent stratifications.

Preferably, the application of aluminium powder is repeated 1 to 4 times.

In block 202, the set comprising substrate 101, bond coat 103, intermediate diffusion layer and layer of aluminium powder applied to block 201 is subjected to appropriate thermal treatment to promote diffusion of the aluminium at least inside a surface portion of the temporary intermediate diffusion layer, thus obtaining an enriched intermediate diffusion layer 105.

Said thermal treatment is performed in a vacuum at a pressure from $10^{-3}$ to $10^{-5}$ bars, at a temperature from 800° C. to 1050° C. and with an active phase lasting 30 minutes to 4 hours, and preferably 60 minutes to 2 hours.

Said thermal treatment is followed by a cooling phase in an inert atmosphere, preferably in argon.

Advantageously, the above-mentioned thermal treatment conditions are such as to permit an adequate diffusion of the aluminium at least in the surface portion of the bond coat 103 with the achievement of satisfactory adhesion of the resulting intermediate diffusion layer 105 to the bond coat. Furthermore, said thermal treatment conditions are such as to favour the formation of an intermediate diffusion layer 105 having an outer surface 106 which is corrugated, irregular and with a high degree of roughness (see also the tables for the roughness values measured).

Preferably, said thermal treatment is performed at a temperature from 850° C. to 1000° C.

Furthermore, the active phase of the thermal treatment preferably has a duration from 90 minutes to 180 minutes.

It has been observed that said preferred thermal treatment conditions make improvement of the properties of the enriched intermediate diffusion layer 105 and, consequently, the thermal barrier coating 101 as a whole particularly sensitive.

Preferably, the thermal treatment of the block 202 is performed repeatedly 1 to 6 times.

Lastly, in block 203 a top coat 104, which typically comprises a ceramic material, for example zirconium stabilised with yttrium, is deposited on the enriched intermediate diffusion layer 105 obtained at the end of block 202. The top coat 104 is advantageously applied by means of a suitable deposition technique known in the art.

In a variation of the method of the invention, the sequence of operations of blocks 201 and 202 is repeated as a whole. In other words, according to said variation of the method of the invention, the application of aluminium powder according to the procedures described and a phase of thermal treatment performed in the operating conditions (temperature, pressure, duration of the active phase) defined previously are followed by at least one new phase of application of aluminium powder according to the same procedures as those described above and at least one new phase of thermal treatment in the operating conditions already described.

Also in this variation, the application of aluminium powder is repeated 1 to 4 times and the thermal treatment phase is performed repeatedly 1 to 6 times. For example, a possible embodiment of said variation is a method in which: the aluminium powder is applied twice (block 201); the thermal treatment is performed once (block 202); the aluminium powder is applied a third time (block 201); the thermal treatment is performed twice (block 202).

From an examination of the characteristics of the method for forming a thermal barrier coating according to the present invention, the advantages it provides are evident.

As will be further appreciated from analysis of the experimental data provided in the examples, the interface 108 defined between the surfaces 106 and 107, of the enriched intermediate diffusion layer 105 obtained according to the method of the invention and the top coat 104 respectively, has an increased surface area and a mean roughness greater than the interface that can be obtained between a bond coat treated by low activity aluminizing process and an equivalent top coat. Due to these improved surface characteristics, a more stable anchoring of the top coat 104 to the layers below is advantageously obtained and therefore, in more general terms, greater stability of the thermal barrier coating 102.

Furthermore, localised aluminium enrichment is obtained at the interface 108.

In particular, with the method of the invention a thermal barrier coating is obtained in a relatively simple and inexpensive manner, the characteristics of which are better than or at least perfectly comparable to those that can be obtained according to the known art.

Furthermore, the method of the invention substantially allows the non-conformities of the overall structure of the coated article 100 to be overcome, by substantially eliminating the horizontal delaminations, the unusual sequence of materials, which is difficult to take into account during design of the components (as in the solution of the known art of FIG. 3), and the impossibility of guaranteeing a complete covering.

It is worth noting, furthermore, that the stage of deposition of the intermediate diffusion layer according to the method of the invention can also be advantageously exploited in a cycle (or operating sequence) of repair of thermal barrier coatings which are non-conforming, chipped or worn due to extensive use.

In particular, in the case of thermal barrier coatings considered to be non-conforming as a result of a quality assessment performed on a new component, it will be possible to remove the top coat and, on the layer immediately below, apply aluminium powder and perform the thermal treatment of blocks 201 and 202 as described previously. On the resulting enriched intermediate diffusion layer thus obtained, a definitive barrier layer will then be applied.

In the case of components already used and, therefore, thermal barrier coatings chipped or worn due to prolonged operation, the repair method will comprise not only the application of aluminium powder and thermal treatment of the blocks 201 and 202 previously described, but will include, upstream of the step of application of aluminium powder, a repetition of the low activity aluminizing step.

The invention will be further described below with reference to non-limiting examples.

Examples

Surface Roughness Measurements

A bond coat was applied on a series of substrate samples from I to VI according to a conventional technique. The surface roughness Ra (mean arithmetic roughness) of the outer surface of the bond coat was measured and the values obtained are reported in the second column of Table 1.

Subsequently, distinct portions of samples from I to VI provided with bond coat were subjected to a high and low activity aluminizing process respectively. At the end of said operation, the surface roughness Ra of the outer surface of the intermediate diffusion layer was measured and the values obtained are reported in the third and fourth column of Table 1.

The portions of samples from I to VI on which the bond coat was subjected to low activity aluminizing process then underwent the application of powdered aluminium and subsequent thermal treatment according to the procedure of the invention.

TABLE 1

| Sample | Ra - Bond Coat [μinches (μm)] | Ra - Bond Coat + "High Activity Al" [μinches (μm)] | Ra - Bond Coat + "Low Activity Al" [μinches (μm)] | Ra - Bond Coat + "Low Activity Al" + method of the invention [μinches (μm)] |
|---|---|---|---|---|
| I | 589 (14.96) | 536 (13.61) | 553 (14.05) | 554 (14.07) |
| II | 532 (13.51) | 532 (13.51) | 474 (12.04) | 563 (14.30) |
| III | 577 (14.65) | 540 (13.72) | 427 (10.84) | 581 (14.75) |
| IV | 560 (14.22) | 528 (13.41) | 445 (11.30) | 580 (14.73) |
| V | 495 (13.64) | 537 (13.64) | 464 (11.78) | 574 (14.58) |
| VI | 585 (13.43) | 529 (13.43) | 452 (11.48) | 547 (13.89) |
| Mean | 556 (14.12) | 534 (13.56) | 463 (11.76) | 567 (14.40) |
| St. Dev. | 37 | 5 | 43 | 14 |

At the end of this operation, the surface roughness Ra of the outer surface of the intermediate diffusion layer obtained according to the method of the invention was measured and the values obtained were reported in the fifth column of Table 1.

It can be easily observed that, with respect to the surface roughness values obtained by subjecting the bond coat to a low activity aluminizing process, those obtained with the process of the invention are, in general, significantly higher. Furthermore, the surface roughness values obtained according to the method of the invention are always significantly higher than those obtained by subjecting the bond coat to a high activity aluminizing process.

Tensile Strength Measurements

Tensile strength tests were performed on some of the samples thus obtained. Table 2 shows the ultimate strength values and the recurrent position of the fracture induced by the test.

TABLE 2

| | Bond Coat + "High Activity Al" + TBC Tensile Strength [MPa] | Bond Coat + "Low Activity Al" + TBC Tensile Strength [MPa] | Bond Coat + "Low Activity Al" + method of the invention + TBC [MPa] |
|---|---|---|---|
| I | 10.3 | 6.9 | 13.5 |
| II | 6.1 | 5.5 | 14.4 |
| III | 11.8 | 8.1 | 13.3 |
| IV | 10.8 | 6.8 | 14.5 |
| Fracture Position | Top Coat | Bond Coat/Top Coat interface | Top Coat |

It is interesting to note that, in the samples in which the bond coat was subjected to low activity aluminizing (third column of Table 2), a significant worsening is observed in the tensile strength with respect to those obtained by subjecting the bond coat to high activity aluminizing (second column of Table 2). However, operating according to the process of the invention (fourth column of Table 2), the tensile strength values are significantly and generally improved.

Furthermore, the fact that the fracture induced by the tensile strength test is systematically located at the level of the top coat and no longer at the interface is a further demonstration of the increased adhesion at the interface between top coat and intermediate diffusion layer.

Surface Roughness Measurements after Top Coat Removal

Surface roughness measurements Ra were performed on samples from which the top coat was removed. This condition simulates the situation in which the top coat has to be removed following damage in which a portion of top coat has been accidentally removed, or of a used component in which the top coat has become progressively worn. In these situations, the top coat must be re-deposited on the surface consisting of bond coat+intermediate diffusion layer.

| Roughness of test pieces "Bond Coat + Al" after top coat removal [μinches (μm)] | | |
|---|---|---|
| Test piece 1 [Ra] | Test piece 2 [Ra] | Test piece 3 [Ra] |
| 278 (7.06) | 360 (9.14) | 239 (6.07) |
| 282 (7.16) | 357 (9.07) | 285 (7.24) |
| 294 (7.47) | 259 (6.58) | 245 (6.22) |
| 407 (10.34) | 320 (8.13) | 270 (6.86) |
| 307 (7.80) | 360 (9.14) | 252 (6.40) |
| 290 (7.37) | 249 (6.32) | 287 (7.29) |
| Mean 310 (7.87) | Mean 318 (8.08) | Mean 263 (6.68) |
| Dev. St. 49 | Dev. St. 52 | Dev. St. 21 |

| Roughness of test pieces "Bond Coat + Al" after removal of top coat and method of the invention [μinches (μm)] | | |
|---|---|---|
| Test piece 1 [Ra] | Test piece 2 [Ra] | Test piece 3 [Ra] |
| 481 (12.22) | 414 (10.51) | 654 (16.61) |
| 523 (13.28) | 420 (10.67) | 502 (12.75) |
| 410 (10.41) | 544 (13.82) | 433 (11.00) |
| 426 (10.82) | 432 (10.97) | 497 (12.62) |
| 480 (12.19) | 566 (14.38) | 407 (10.34) |
| 479 (12.17) | 494 (12.55) | 520 (13.21) |
| Mean 467 (11.86) | Mean 478 (12.14) | Mean 502 (12.75) |
| Dev. St. 41 | Dev. St. 66 | Dev. St. 86 |

Morphological Analysis

Micrographs

Figure 6:
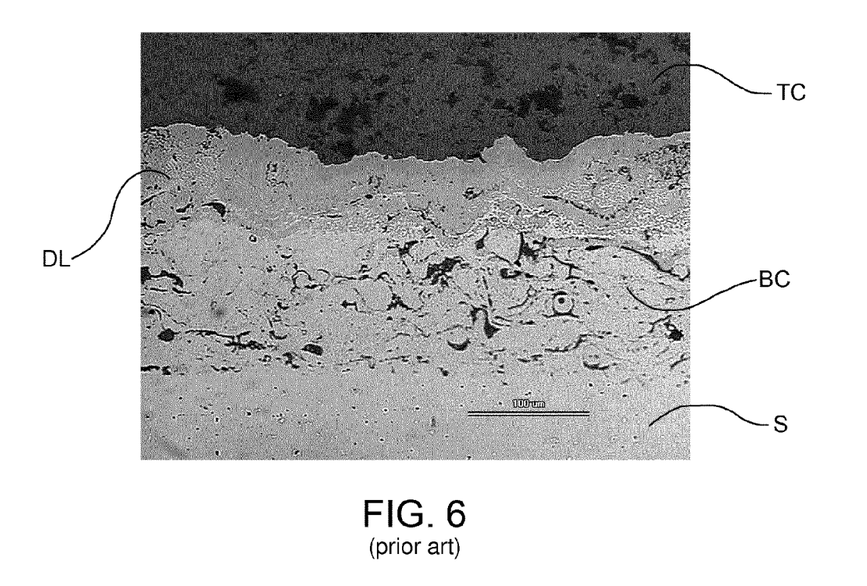
FIG. 6 is a micrograph which illustrates the morphology of a thermal barrier coating obtained according to a method of the known art.

The morphology of a sample obtained according to the method of the invention (FIG. 7) was compared with that of a sample obtained by subjecting the bond coat to a low activity aluminizing process (FIG. 6).

Figure 7:
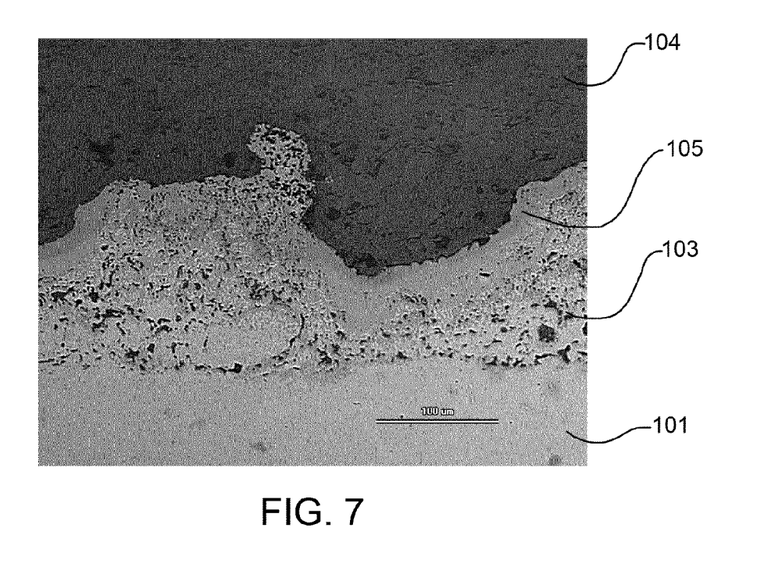
FIG. 7 is a micrograph which illustrates the morphology of a thermal barrier coating obtained according to the method of the present invention.

In particular, the sample of FIG. 7 subjected to morphological analysis was obtained by applying aluminium powder having size distribution from 30 to 100 μm on the bond coat, performing the local application of aluminium twice.

Furthermore, the sample was subjected to two thermal treatments in a vacuum, the active phase of which was performed at a temperature from 850° C. to 1000° C. and had a duration varying from 90 to 120 minutes.

For practical purposes, in order to facilitate identification of the various layers of the thermal barrier coating applied to the substrate and to facilitate comparison with the solutions previously illustrated schematically, in the micrographs of FIGS. 6 and 7 the same reference symbols were used as those used in FIGS. 2 and 4 respectively.

It is immediately evident that the method of the invention allows a thermal barrier coating to be obtained in which the intermediate diffusion layer between bond coat and top coat has a corrugated upper surface, with much more accentuated mean roughness than a corresponding intermediate diffusion layer obtained according to a conventional technique. Due to said increased roughness, the anchoring of the top coat to the layers below is much easier in the relative deposition phase and the overall stability of the entire thermal barrier coating is considerably improved.

This surprising effect translates into a greater effectiveness as a thermal barrier and increased mechanical resistance to thermal fatigue of the entire coating. Consequently, the working life of the articles coated with a coating obtained according to the method of the invention is significantly increased, in particular in the hostile working conditions of the components of turbines for the aeronautical sector and the production of energy.

The invention claimed is:

1. A method for forming a thermal barrier coating (102) on a substrate (101), comprising the steps of:
   a) applying a bond coat (103) on said substrate (101);
   b) subjecting said bond coat (103) to a low activity aluminizing process, thus obtaining a temporary intermediate diffusion layer on said bond coat (103);
   characterized in that it comprises the steps of
   c) applying on said temporary intermediate diffusion layer obtained from said phase b) aluminium powder in suspension with a solvent or aqueous base, said aluminium powder having a size distribution from 15 to 150 μm;
   d) carrying out a vacuum heat treatment on the substrate, bond coat and temporary intermediate diffusion layer as a whole, at a pressure from $10^{-3}$ to $10^{-5}$ bar, at a temperature from 800° C. to 1050° C. and with an active phase in the range of 60 min-4 h, thus obtaining an enriched intermediate diffusion layer (105) on said bond coat (103); and
   e) applying a definitive barrier layer (104) on said enriched intermediate diffusion layer (105).

2. A method according to claim 1, wherein said aluminium powder has a size distribution from 30 to 100 μm.

3. A method according to claim 1, wherein said step c) of applying said aluminium powder is repeated 1-4 times.

4. A method according to claim 1, wherein said step d) of heat treatment is carried out at a temperature from 850° C. to 1000° C.

5. A method according to claim 1, wherein said step d) of heat treatment has an active phase with a duration in the range of 90-180 min.

6. A method according to claim 1, wherein said step d) of heat treatment is repeatedly carried out 1-6 times.

7. An article (100) comprising a substrate (101) and a thermal barrier coating (102) applied on said substrate, characterized in that said thermal barrier coating (102) is formed by means of a method according to claim 1.

8. A method for repairing an article (100) comprising a substrate (101) coated with a thermal barrier coating comprising a bond coat (103); characterized in that it comprises the steps of:
   i) subjecting said bond coat (103) to a low activity aluminizing process, thus obtaining a temporary intermediate diffusion layer on said bond coat (103);

j) applying, on said temporary intermediate diffusion layer, aluminium powder in suspension with a solvent or aqueous base, said aluminium powder having a size distribution from 15 to 150 μm;

k) carrying out a thermal vacuum treatment on the substrate, bond coat and temporary intermediate diffusion layer as a whole, at a pressure from $10^{-3}$ to $10^{-5}$ bar, at a temperature from 800° C. to 1050° C. and with an active phase in the range of 60 min-4 h, thus obtaining an enriched intermediate diffusion layer (105) on said bond coat (103); and l) applying a definitive barrier layer (104) on said enriched intermediate diffusion layer (105).

9. A method for repairing an article (100) comprising a substrate (101) coated with a thermal barrier coating comprising a bond coat (103) and a temporary intermediate diffusion layer arranged on said bond coat; characterized in that it comprises the steps of:

j) applying, on said temporary intermediate diffusion layer, aluminium powder in suspension with a solvent or aqueous base, said aluminium powder having a size distribution from 15 to 150 μm;

k) carrying out a thermal vacuum treatment on the substrate, bond coat and temporary intermediate diffusion layer as a whole, at a pressure from 10-3 to 10-5 bar, at a temperature from 800° C. to 1050° C. and with an active phase in the range of 60 min-4 h, thus obtaining an enriched intermediate diffusion layer (105) on said bond coat (103); and l) applying a definitive barrier layer (104) on said enriched intermediate diffusion layer (105).

\* \* \* \* \*